United States Patent Office 2,814,572
Patented Nov. 26, 1957

2,814,572

ORGANOSILICON COMPOUNDS AND A METHOD FOR WATERPROOFING GLASS AND PRODUCT PRODUCED THEREBY

Cecil L. Frye, Midland, Mich., assignor to Dow Corning Corporation, Midland, Mich., a corporation of Michigan No Drawing. Application August 17, 1955,
Serial No. 529,068

18 Claims. (Cl. 117—124)

This invention relates to amine salts of certain organosilicon compounds.

This application is a continuation-in-part of applicant's copending application Serial No. 465,436, filed October 28, 1954, which is in turn a continuation-in-part of his application Serial No. 455,340, filed September 10, 1954, both of which are now abandoned.

There has long been a need for suitable water soluble organosilicon compounds which when applied to surfaces would render them water repellent or impart some other desirable property. The advantage of a water soluble material is that it obviates the necessity of using organic solvents which are either inflammable or toxic or both. Organic solvents are particularly hazardous when it is necessary to spray them on a surface since the fine mist thereby created often causes pulmonary edema. In addition the fine mist may be highly inflammable.

The treatment of glass surfaces with organosilicon compounds has been advocated for some time. In general, this treatment involves the use of chlorosilanes either in vapor phase or in an organic solvent solution or the use of an aqueous alcoholic solution of an organosilanol. The former method created several problems due to the corrosive nature of the HCl evolved. Furthermore, the hydrochloric acid reacts with metal ions on the surface of the glass forming metal halides. These halides form underneath the coating of the siloxane and hence cannot be washed out subsequent to the treatment. However, under humid conditions metal chlorides will absorb moisture and thereafter migrate through the siloxane coating. When the atmosphere becomes drier crystalline deposits will form on the surface thereby forming spots. This is highly objectionable since it mars the appearance of the glass. The use of the materials of this invention obviates this difficulty.

The use of aqueous alcoholic solutions in silanols in one form or another has been advocated for the treatment of glass surfaces. This method gets around the difficulties caused by HCl evolution but suffers from the disadvantage of instability of the solution thereby rendering the process difficult. Furthermore, the application of organosilicon compounds by this method is generally limited to the use of lower aliphatic organosilicon compounds.

It is the object of this invention to provide novel organosilicon compositions which are water soluble and which can be employed in the treatment of siliceous surfaces. Another object is to provide materials suitable for sizing glass fibers. Another object is to provide materials suitable for lubricating glass surfaces. Another object is to provide materials suitable for rendering masonry water repellent. Another object is to provide materials suitable for application to textiles.

Other objects and advantages will be apparent from the following description.

This invention relates to compositions of matter of the formula $R_nSi(OCHR''CH_2NR'_2 \cdot HY)_{4-n}$ and partial condensates thereof in which R is a monovalent hydrocarbon radical, hydrogen or hydrocarbonoxy radical, $n$ has a value from 1 to 3 inclusive, R'' is hydrogen or methyl, R' is a hydrocarbon radical of less than 11 carbon atoms, hydrogen or a hydroxy alkyl radical having from 2 to 3 carbon atoms inclusive and Y is of the group chlorine and acyloxy radicals of less than 4 carbon atoms.

The compositions of this invention can be monomeric silanes, polymeric silanes, or partial condensates of these silanes, i. e. polymeric materials in which some or all of the silicon atoms are linked through oxygen atoms. The polymeric silanes are formed when some of the R groups are derived from polyhydric alcohols. In such cases some of the hydrocarbonoxy radicals form links between two or more silicon atoms. In all compositions within the scope of this invention at least 1 of the R groups attached to each silicon is a monovalent hydrocarbon radical, any remaining R groups being hydrogen and/or hydrocarbonoxy radicals (i. e. radicals composed of C, H and O).

The compositions of this invention are best prepared by reacting silanes of the formula $R_nSiY_{4-n}$ in which R, $n$ and Y are as above defined, with amines of the formula $R'_2NCH_2CHR''OH$ where R' and R'' are as above defined. If desired, this reaction may be carried out in the presence of hydrocarbon solvents such as benzene, toluene, petroleum ether, chlorinated hydrocarbon solvents such as methylene chloride and the like or in the presence of tertiary alcohols such as t-butanol. Preferably the solvent should be a low boiling material which is easily removed after the reaction is complete.

The materials of this invention are presumably formed by the reaction of the Y group on the silicon with the hydroxyl of the amine to split out an acid HY which then adds to the nitrogen to form an amine salt. It is this salt which is the solubilizing group on the molecule.

The partial condensates of this invention may be prepared by partially hydrolyzing the amino silanes. Alternatively they may be prepared by reacting the amino alcohols with halosiloxanes or acyloxy siloxanes such as, for example, $RCl_2SiOSiCl_2R$ or siloxanes of the formula $RSi(OAc)_{.5}O_{1.25}$.

Alternatively the partial condensates or the monomeric or polymeric silanes can be made by heating a siloxane such as octamethylcyclotetrasiloxane with an amino alcohol in the presence of an alkali metal hydroxide or other strong base, preferably removing the by-produced water from the reaction zone as it is formed, then acidifying.

For the purpose of this invention the R groups on the silicon can be any monovalent hydrocarbon radical such as alkyl radicals such as methyl, ethyl, butyl, isopropyl and octadecyl; aryl radicals such as phenyl, tolyl and xenyl; aralkyl radicals such as benzyl; alkenyl radicals such as vinyl, allyl and hexenyl and cycoaliphatic radicals such as cyclopentyl, cyclohexyl and cyclohexenyl.

Some of the R groups can also be any hydrocarbonoxy radical such as alkoxy radicals such as methoxy, ethoxy, isopropoxy, t-butoxy and stearyloxy; alkenyloxy radicals such as allyloxy; aryloxy radicals such as phenoxy, cresoxy, resorcinoxy, naphthoxy, xenoxy and xylenoxy; hydroxylated radicals such as β-hydroxyalkoxy, β-hydroxyisopropoxy, 6-hydroxyhexoxy and glyceryl; alkoxylated radicals of the formula $O(CH_2)_xOA$ where $x$ is an integer and A is a hydrocarbon radical such as methyl, ethyl and butyl; and radicals of the formula $=OB$ where B is a polyalkylene oxide residue of any desired molecular weight such as

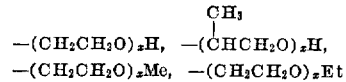

and $—(CH_2CH_2O)_x—$ in which both ends of the polyethylene oxide residue are attached to a silicon atom.

All of the hydrocarbonoxy radicals are attached to the silicon through at least one oxygen atom.

The Y groups in the compounds of this invention can be a chlorine atom or an acetoxy, propionyl or formoyl radical.

The R' groups on the nitrogen can be hydrogen or any monovalent hydrocarbon radical of less than 11 carbon atoms or hydroxy ethyl or hydroxy propyl radicals. Thus R' can be, for example, β-hydroxyethyl, 2-hydroxypropyl, methyl, ethyl, octyl, vinyl, tolyl, phenyl, cyclohexyl or benzyl. Thus it can be seen that the amines which can be employed to produce the compounds of this invention are tolyl ethanol amine, tolyl diethanol amine, α-methylbenzyl diethanol amine, N-ethyl ethanol amine, N-ethyldiethanol amine, N-methyl diethanol amine, N,N-diethyl ethanol amine, N,N-diisopropyl ethanol amine, N-butyl ethanol amine, N,N-dibutyl ethanol amine, N-butyl diethanol amine, N,N(2-ethylhexyl)ethanol amine, N,N-dimethylisopropanol amine, N,N-dibutylisopropanol amine, N-methyl ethanol amine, N,N-dimethyl ethanol amine, monoethanol amine and diethanol amine. It should be understood that a mixture of two or more hydroxy amines may be employed so that there may be two or more different amino groups attached to each silicon atom or to various silicon atoms in the product.

For the purpose of this invention it is preferred that both of the R' groups on the nitrogen be hydrocarbon radicals and further that these radicals contain less than 7 carbon atoms. These preferred materials are soluble in water whereas the materials having higher hydrocarbon groups on the nitrogen or those in which some of the R' groups are hydrogen are less soluble in water or are insoluble. The latter materials, however, are useful for rendering surfaces water repellent since they may be applied undiluted or in organic solvents.

The compositions of this invention are excellent for treating glass surfaces. This is particularly true where the R group is an alkenyl radical or a higher alkyl radical having at least 10 carbon atoms. The alkenyl substituted silanes are particularly adaptable for sizing glass fibers in preparation of the bonding of organic resins thereto. Those silanes having higher alkyl groups attached to the silicon are particularly adaptable for lubricating glass surfaces. Glass articles which have been treated with these higher alkyl silanes can be stored without interleaving material and are much less likely to be damaged during handling and packaging than untreated glass.

In applying the materials of this invention to masonry surfaces it is preferred that they be employed in concentrations of from 1 to 10% by weight of the solution. For treatment of glass, concentrations as low as .05% by weight of the solution may be advantageously employed with the optimum concentration being from .1 to 1%. After treatment the glass may be dried at room temperature or heated for a few minutes at say 150° C.

It should be understood that these materials are useful for other surfaces such as those of textile fibers such as cotton, wool, nylon, rayon, acrylonitrile fibers and the like; paper, wood, metal and organic plastics.

If the aqueous solutions are to be stored for some time prior to use, it is best to add a small amount say about .2% of a weak acid such as acetic acid. This stabilizes the solution. It has been found that the best stability is obtained at a pH of about 4–6.

The following examples are illustrative only and should not be construed as limiting the invention which is properly delineated in the appended claims.

Throughout these examples the hydrocarbon radicals are indicated by the first two letters of their name, i. e., stearyl (octadecyl) as St, methyl as Me, phenyl as Ph, vinyl as Vi etc.

Example 1

A solution of 89 g. of 2-dimethylaminoethanol in 100 g. of methylene chloride was added dropwise to a solution of 129.2 g. of octadecyltrichlorosilane in 200 g. of methylene chloride. During addition of the amine solution a precipitate formed so 400 additional grams of methylene chloride were added. After addition of the amine was complete the precipitated product was dissolved in t-butanol to give a 20% by weight solution of the salt and the methylene chloride was removed by evaporation. Water containing .5% by weight acetic acid was then added in amount sufficient to give a 3% by weight solution of the salt

$C_{18}H_{37}Si(OCH_2CH_2NMe_2 \cdot HCl)_3$

A concrete cube was dipped into this solution for 5 secs. then air dried for 24 hours at 50% relative humidity at 25° C. The cube was then weighed and immersed in a ¼" constant head of water for 24 hours. It was then taken out of the water and the excess moisture removed by blotting. The cube was weighed and the gain in weight was found to be .59% which represents the amount of water absorbed by the concrete. The contact angle made by drops of water on the surface of the cube was good. These tests prove that this material is excellent for rendering masonry water repellent.

Example 2

A solution of 88.8 g. of propyltrichlorosilane in 400 g. of methylene chloride was added slowly to a solution of 133 g. of 2-dimethylaminoethanol in 200 g. of methylene chloride. A solid precipitated and was dissolved by the addition of t-butanol. The methylene chloride was then evaporated and enough t-butanol was added to give a 27% by weight solution of the salt

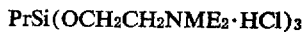

$PrSi(OCH_2CH_2NME_2 \cdot HCl)_3$

This material is water soluble and renders masonry water repellent.

Example 3

A solution of 133.5 g. of 2-dimethylaminoethanol in 200 g. of methylene chloride was added to 74.8 g. of methyltrichlorosilane in 400 g. of methylene chloride. Salt precipitated and was dissolved in a mixture of t-butanol and methanol to give a 21% by weight solution of the salt $MeSi(OCH_2CH_2NMe_2 \cdot HCl)_3$. This material is water soluble and renders concrete water repellent.

Example 4

A solution of 74.8 g. of methyltrichlorosilane and 400 g. of methylene chloride was added to a solution of 91.5 g. of monoethanol amine in 200 g. of methylene chloride. The reaction mixture was cooled to a temperature of —20° C. at the start of the reaction and during the reaction it warmed to 35° C. The salt

$MeSi(OCH_2CH_2NH_2 \cdot HCl)_3$ precipitated and was dissolved in methanol. The salt is water soluble.

Example 5

A solution of 108.6 g. of trimethylchlorosilane in 108.6 g. of methylene chloride was added with cooling to a solution of 89 g. of 2-dimethylaminoethanol in 89 g. of methylene chloride. The methylene chloride was evaporated at a temperature from 90° to 100° C. leaving a solid powder of the formula

$Me_3SiOCH_2CH_2NMe_2 \cdot HCl$

This salt was water soluble.

Example 6

A solution of 2.65 g. of phenyltrichlorosilane in 30 g. of acetonitrile was added to a solution of 3.35 g. of 2-dimethylaminoethanol in 30 g. of acetonitrile. Each solution was cooled to −30° C. before mixing. During the reaction the temperature rose to 10° C. After reaction was complete the solvent was removed to give a solid water soluble material having the formula PhSi(OCH₂CH₂NMe₂·HCl)₃

Example 7

Water soluble materials are obtained when diethyldichlorosilane is reacted with 2-dimethylamino ethanol in the manner of Example 1. The resulting product is Et₂Si(OCH₂CH₂NMe₂·HCl)₂.

Example 8

12.9 g. of StSiCl₃ was added slowly to a mixture of 11.7 g. of N,N-diethyl ethanol amine and 30 g. of t-butanol. During addition of the stearyl trichlorosilane the mixture was cooled occasionally in an acetone Dry-Ice bath. The resulting product was a water soluble salt of the formula StSi(OCH₂CH₂NEt₂·HCl)₃.

Example 9

12.9 g. of StSiCl₃ were added to a mixture of 8.9 g. of N-ethyl ethanol amine and 30 g. of t-butanol. The mixture was cooled in a Dry-Ice acetone bath during addition of the chlorosilane. The resulting product was the compound StSi(OCH₂CH₂NHEt·HCl)₃. This material is soluble in t-butanol and in aqueous t-butanol.

Example 10

Using the procedure of Example 8 a mixture of 7.5 g. of methyltrichlorosilane and 10 g. of acetonitrile was added to 20.6 g. of N-phenylethanol amine in 30 g. of t-butanol. The resulting product was the salt MeSi(OCH₂CH₂NHPh·HCl)₃

This material was soluble in t-butanol and in aqueous butanol solutions but not in water.

Example 11

Using the procedure of Example 9 a solution of 6 g. of methyltrichlorosilane in 10 g. of acetonitrile was added to a mixture of 19.8 g. of N-phenyl-N-ethylethanol amine. The resulting product was a viscous material having the formula MeSi(OCH₂CH₂NEtPh·CHl)₃. This material is soluble in t-butanol and acetonitrile. It is also soluble in aqueous t-butanol.

Example 12

52.5 g. of diethanol amine were agitated while 64.5 g. of StSiCl₃ were slowly added. During addition of the chlorosilane a precipitate formed so 80 cc. of t-butanol was added. A clear solution was obtained and the resulting product was the salt

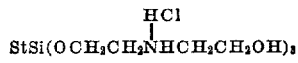

This material was water soluble.

Example 13

5.4 g. of vinyltrichlorosilane was added to 8.9 g. of dimethylethanol amine in 20 g. of t-butanol. The resulting product was water soluble and had the formula ViSi(OCH₂CH₂NMe₂·HCl)₃.

Example 14

77 g. of vinyltriacetoxysilane was added in 10 g. quantities with cooling to 30° C. to 89 g. of N,N-dimethylethanol amine. During addition the temperature was maintained below 45° C. The resulting product was a water soluble salt ViSi(OCH₂CH₂NMe₂·HOAc)₃.

Example 15

258.4 g. of StSiCl₃ was added slowly to a mixture of 178 g. of N,N-dimethylaminoethanol in 350 g. of t-butanol. The reaction temperature during reaction rose from room temperature to 80° C. The resulting product solidified upon cooling but dissolved when diluted with more butanol to give a 20% solution. The reaction product was a material having stearyl groups attached to the silicon and the remaining valences of the silicon being satisfied by both t-butoxy radicals and radicals of the formula (—OCH₂CH₂NMe₂·HCl). This salt was water soluble.

Example 16

When 1 mol of methyldiethoxychlorosilane is reacted with 1 mol of N,N-dimethylaminoethanol in accordance with the procedure of Example 1, the water soluble product MeSi(OEt)₂(OCH₂CH₂NMe₂·HCl) is obtained.

Example 17

When 1 mol of the chlorosiloxane St(Cl₂)SiOSiSt(Cl₂) is reacted with 4 mols of N,N-dimethylethanol amine in accordance with the procedure of Example 1, the water soluble product (ClH·Me₂NCH₂CH₂O)₂StSiOSiSt(OCH₂CH₂NMe₂·HCl)₂ is obtained.

Example 18

34.6 g. of StMe₂SiCl was added to 8.9 g. of N,N-dimethylaminoethanol. The resulting product was water soluble and had the formula StMe₂SiOCH₂CH₂NMe₂·HCl

Example 19

5.8 g. methyldichlorosilane dissolved in 20 g. of acetonitrile was added to a solution of 8.9 g. of N,N-dimethylaminoethanol in 20 g. of t-butanol. The mixture was cooled during addition of the chlorosilane. The resulting product was the salt MeHSi(OCH₂CH₂NMe₂·HCl)₂

This material was soluble in water.

Example 20

10.3 g. of 1-dimethylamino 2-propanol dissolved in 20 g. of methylene chloride was added to a solution of 12.9 g. of StSiCl₃ in 50 g. of methylene chloride. After removal of the solvent there was obtained the salt

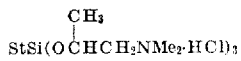

which was water soluble.

Example 21

The compound StSi(OCH₂CH₂NMe₂·HCl)₃ was dissolved in water to give a .2% by weight solution of the salt. A piece of flat glass was partially dipped into the solution. After two or three seconds the glass was withdrawn and it was found that the glass was water repellent to the solution as it was being withdrawn. With the types of organosilicon compounds heretofore employed in aqueous media on glass, water repellency does not develop until after heating.

A second piece of flat glass was dipped into a .2% by weight solution of this salt in water. The solution also contained .2% by weight acetic acid. The glass was then removed from the solution and dried for 10 minutes at 150° C. The sharp edge of a glass slide was drawn across the treated flat glass. It left no scratch on that portion of the flat glass which had come in contact with the solution while the untreated portion was scratched badly.

A carborundum tipped stylus was drawn across a piece of glass a part of which had been treated as in the preceding paragraph. The load on the point of the stylus was 300,000 p. s. i. A microphotograph of the resulting scratch showed that the glass on the untreated portion was actually torn from the surface while on the treated surface there was a smooth mark free from any fracture.

Example 22

When 1 mol of StSi(OAc)₃ is reacted with three mols of 1-dimethyl amino 2-propanol in accordance with the method of Example 20 the salt

StSi(OCHCH₂NMe₂·OAc)₃ is obtained.

Example 23

A mixture of 194 g. of StSiCl₃ and 240 g. of a polyethylene oxide glycol having an average molecular weight of 600 was heated to 199° C. as HCl was evolved. 48.7 g. of diethylethanolamine in 492 g. of t-butanol was added to 240 g. of the reaction product. The final product was a t-butanol solution of a compound having 1 stearyl group per silicon, an average of 1.4 OCH₂CH₂NEt₂·HCl groups per silicon with the remaining valences of the silicon being attached to the polyethylene oxide residue.

This material was water soluble and when applied to glass gave excellent lubricity. Labels coated with a water base glue could be readily adhered to the treated glass surface.

Example 24

18.74 g. of the monomethylether of a polyethylene oxide glycol having an average molecular weight of 350 was reacted with 12.9 g. of StSiCl₃ at a temperature of 150–160° C. The reaction product was added to a solution of 4.9 g. of diethylethanolamine in 80 g. of t-butanol. The product had the average formula StSi[O(CH₂CH₂O)₇.₉OMe]₁.₆[OCH₂CH₂NEt₂·HCl]₁.₄

This material was water soluble and was an excellent lubricant for glass.

Example 25

55.1 g. of resorcinol, 88.3 g. of allyltrichlorosilane and 40.4 g. of vinyltrichlorosilane were mixed and heated until 22.8 g. of HCl was removed together with 5.6 g. of a mixture of 85% vinyltrichlorosilane and 15% allyltrichlorosilane.

73.3 g. of the reaction product was dissolved in an equal weight of methylene chloride and was added to a solution of 53.3 g. of dimethylethanolamine in 400 cc. of methylene chloride. After addition was complete the product was still red so 14 cc. more of dimethylethanolamine was added whereupon the color changed to brownish-yellow. The methylene chloride was removed under vacuum. Toward the end of the removal of the methylene chloride 300 g. of t-butanol was added. The residue was then diluted to 20% solids with t-butanol. 6 g. of acetic acid was added. The product was stable in aqueous solution.

The product was a mixture of materials in which each silicon atom had either one vinyl or one allyl group attached thereto and the remaining valences of the silicon atoms in the mixture were satisfied by resorcinoxy radicals

and (—OCH₂CH₂NMe₂·HCl) radicals.

That which is claimed is:

1. A composition of matter of the group consisting of silanes of the formula R$_n$Si(OCHR''CH₂NR'₂·HY)$_{4-n}$ and partial condensates thereof, in which R is selected from the group consisting of monovalent hydrocarbon radicals, hydrogen atoms and hydrocarbonoxy radicals, the latter being attached to the silicon through at least one oxygen atom, there being at least 1 hydrocarbon radical attached to each silicon atom, n has a value from 1 to 3 inclusive, R'' is of the group consisting of hydrogen and methyl radicals, R' is of the group consisting of hydrocarbon radicals of less than 11 carbon atoms, hydrogen atoms and hydroxy alkyl radicals having from 2 to 3 carbon atoms inclusive and Y is of the group consisting of chlorine atoms and acyloxy radicals of less than 4 carbon atoms.

2. A silane of the formula

R$_n$Si(OCHCH₂NR'₂·HCl)$_{4-n}$ in which R is a monovalent hydrocarbon radical, n has a value from 1 to 3 inclusive and R' is a monovalent hydrocarbon radical of less than 11 carbon atoms.

3. Water soluble partial condensates of the silanes of claim 2.

4. A silane of the formula

R$_n$Si(OCH₂CH₂NR'₂·HCl)$_{4-n}$ in which R is a monovalent hydrocarbon radical, n has a value from 1 to 3 inclusive and R' is a monovalent hydrocarbon radical of less than 11 carbon atoms.

5. Water soluble partial condensates of the silanes of claim 4.

6. A silane of the formula

R$_n$Si(OCHCH₂NR'₂·HOAc)$_{4-n}$ in which R is a monovalent hydrocarbon radical, n has a value from 1 to 3 inclusive and R' is a monovalent hydrocarbon radical of less than 11 carbon atoms.

7. Water soluble partial condensates of the silanes of claim 6.

8. A silane of the formula
R$_n$Si(OCH₂CH₂NR'₂·HOAc)$_{4-n}$ in which R is a monovalent hydrocarbon radical, n has a value from 1 to 3 inclusive and R' is a monovalent hydrocarbon radical of less than 11 carbon atoms.

9. Water soluble partial condensates of the silanes of claim 8.

10. C₁₈H₃₇Si(OCH₂CH₂NMe₂·HCl)₃.

11. ViSi(OCH₂CH₂NMe₂·HCl)₃.

12. ViSi(OCH₂CH₂NMe₂·HOAc)₃.

13. A silane of the formula

R$_n$Si(OCH₂CH₂NR'₂·HCl)$_{4-n}$ in which some of the R groups on each silicon atom are monovalent hydrocarbon radicals and the remaining R groups are hydrocarbonoxy radicals attached to the silicon through at least one oxygen atom, n has a value from 1 to 3 inclusive and R' is a monovalent hydrocarbon radical of less than 11 carbon atoms.

14. A water soluble partial condensate of the silanes of claim 13.

15. A method of treating glass to render it water repellent and to modify the surface thereof, which comprises applying to the surface of the glass an aqueous solution of a material of the group consisting of silanes of the formula R$_n$Si(OCHR''CH₂NR'₂·HY)$_{4-n}$ and partial condensates thereof, in which R is selected from the group consisting of monovalent hydrocarbon radicals, hydrogen atoms and hydrocarbonoxy radicals, the latter being attached to the silicon by at least one oxygen atom, there being at least 1 hydrocarbon radical attached to each silicon atom, n has a value from 1 to 3 inclusive, R'' is of the group consisting of hydrogen and methyl radicals, R' is of the group consisting of hydrocarbon radicals of less than 11 carbon atoms, hydrogen atoms and hydroxy alkyl radicals having from 2 to 3 carbon atoms inclusive and Y is of the group consisting of chlorine atoms and acyloxy radicals of less than 4 carbon atoms, and thereafter drying the surface of the glass.

16. The method in accordance with claim 15 in which at least one R is an octadecyl radical.

17. The method in accordance with claim 15 in which at least one R is a vinyl radical.

18. An article of manufacture comprising glass coated with a material of the group consisting of silanes of the formula R$_n$Si(OCHR''CH₂NR'₂·HY)$_{4-n}$ and partial condensates thereof, in which R is selected from the group consisting of aliphatic hydrocarbon radicals of at least 10 carbon atoms, hydrogen atoms and alkoxy radicals, there being at least 1 of said aliphatic hydrocarbon radicals attached to each silicon atom, $n$ has a value of from 1–3 inclusive, R" is of the group consisting of hydrogen and methyl radicals, R' is of the group consisting of hydrocarbon radicals of less than 11 carbon atoms, hydrogen atoms and hydroxy alkyl radicals having from 2–3 carbon atoms inclusive and Y is of the group consisting of chlorine atoms and acyloxy radicals of less than 4 carbon atoms.

References Cited in the file of this patent

UNITED STATES PATENTS 2,637,623     Janes  ---------------- May 5, 1953

UNITED STATES PATENT OFFICE

CERTIFICATE OF CORRECTION

Patent No. 2,814,572

November 26, 1957

Cecil L. Frye

It is hereby certified that error appears in the printed specification of the above numbered patent requiring correction and that the said Letters Patent should read as corrected below.

Column 5, line 44, for "$MeSi(OCH_2CH_2NEtPh \cdot CHl)_3$" read

-- $MeSi(OCH_2CH_2NEtPh \cdot HCl)_3$ --.

Signed and sealed this 11th day of February 1958.

(SEAL)
Attest:

KARL H. AXLINE
Attesting Officer

ROBERT C. WATSON
Commissioner of Patents